United States Patent [19]

Koriyama

[11] Patent Number: 5,523,912
[45] Date of Patent: Jun. 4, 1996

[54] MAGNETIC HEAD POSITIONER FOR MAGNETIC DISK APPARATUS WHICH CAN PREVENT MECHANICAL SHOCK

[75] Inventor: Hiroshi Koriyama, Tokyo, Japan

[73] Assignee: NEC Corporation, Tokyo, Japan

[21] Appl. No.: 318,113

[22] Filed: Oct. 5, 1994

[30] Foreign Application Priority Data

Oct. 26, 1993 [JP] Japan ................... 5-266819

[51] Int. Cl.⁶ ..................... G11B 5/54; G11B 21/02
[52] U.S. Cl. ............................. 360/106; 360/105
[58] Field of Search .................. 360/104–106, 360/109

[56] References Cited

U.S. PATENT DOCUMENTS

| | | | |
|---|---|---|---|
| 4,734,805 | 3/1988 | Yamada et al. | 360/104 |
| 5,034,837 | 7/1991 | Schmitz | 360/106 |
| 5,109,310 | 4/1992 | Ohkjita et al. | 360/106 |
| 5,189,577 | 2/1993 | Nishida et al. | 360/106 |
| 5,214,552 | 5/1993 | Haga | 360/104 |
| 5,291,360 | 3/1994 | Foote | 360/104 |
| 5,303,101 | 4/1994 | Hatch et al. | 360/105 |
| 5,365,389 | 11/1994 | Jabbari et al. | 360/105 |

FOREIGN PATENT DOCUMENTS

| | | | |
|---|---|---|---|
| 59-121664 | 7/1984 | Japan | 360/106 |
| 63-58678 | 3/1988 | Japan | 360/105 |
| 1-253878 | 10/1989 | Japan | 360/105 |
| 4-137272 | 5/1992 | Japan | 360/109 |

*Primary Examiner*—Stuart S. Levy
*Assistant Examiner*—Jefferson Evans
*Attorney, Agent, or Firm*—Young & Thompson

[57] ABSTRACT

An arm assembly has a front end portion on which a plurality of magnetic heads opposed to a plurality of magnetic disk media, respectively, for writing/reading information are mounted, a rear end portion having a C shaped arm formed with a pair of holes or recesses having a predetermined depth and a center portion rotatably supported by a rotational shaft through bearings. A coil is fixedly secured to an inside surface of the C shaped arm through an adhesive for driving the arm assembly. A permanent magnet assembly is disposed in a location opposing the coil and constituting a magnetic circuit together with the coil. A pair of stoppers are provided on opposite sides of the C shaped arm with predetermined spaces and adapted to restrict a rotational movement of the C shaped arm by contacting with collision surfaces of the C shaped arm. The holes or the recesses of the C shaped arm may be filled with elastic material having superior vibration attenuating characteristics.

20 Claims, 5 Drawing Sheets

MAGNETIC HEAD POSITIONER FOR MAGNETIC DISK APPARATUS WHICH CAN PREVENT MECHANICAL SHOCK

BACKGROUND OF THE INVENTION

1. Field of the Invention

The present invention relates to a magnetic disk apparatus to be used in a data processor and, particularly, to a magnetic head positioner for a magnetic disk apparatus, which can prevent mechanical shock generated when an arm assembly collides with a stopper by erroneous operation or reckless run of the assembly from being transmitted to the magnetic head.

2. Description of the Related Art

In a conventional magnetic disk apparatus, a magnetic head is generally mounted on a rotary carriage. The magnetic head magnetically reads/writes information with respect to a recording surface of a magnetic disk medium which is rotating at high speed while being floated above the recording surface with a minute gap due to air pressure generated by the high speed rotation of the magnetic disk medium.

Further, servo information, that is, information for positioning the magnetic head at a predetermined location of the magnetic disk medium, is written in specific information recording areas of the magnetic disk medium. In the magnetic disk apparatus, the positioning of a data head with respect to a data recording area of the magnetic disk medium is performed based on the servo information. This system is referred to as a closed servo loop system. With this system, it becomes possible to perform a high speed positioning of the rotary carriage at the predetermined position on the magnetic disk medium.

Nowadays, seek time of a magnetic disk apparatus, that is, time necessary to move a magnetic head thereof to a predetermined location on a magnetic disk medium by driving a rotary carriage, of not more than 10 ms has been realized.

A magnetic head positioner for a conventional magnetic disk apparatus will be described with reference to FIG. 1.

In the magnetic head positioner for the conventional magnetic disk apparatus shown in FIG. 1, a plurality of magnetic disk media 1 are fixed to a spindle shaft 2 of a spindle motor (not shown) through a clamp ring 7 and a spindle hub (not shown). Opposite end portions of the shaft 2 are rotatably supported by base plates 3 provided within the magnetic disk apparatus through bearings (not shown), respectively. Thus, the plurality of the magnetic disk media 1 are rotatably supported within the magnetic disk apparatus.

On the other hand, a magnetic head 9 is provided correspondingly to each magnetic disk medium 1 for writing/reading information with respect thereto and the magnetic heads 9 are supported by front end portions of respective arm assemblies 12 so that they can be swung.

The arm assembly 12 is rotatably supported at a center portion thereof by a rotational shaft 13 through a bearing 14. The arm assembly 12 includes at a rear end portion a C shaped arm 50 and a coil 15 for rotationally driving the arm assembly 12 is fixed in a concave portion of the C shaped arm 50 by flexible adhesive 45.

A permanent magnet assembly 17 is arranged in a facing relation to the coil 15 in order that the arm assembly 12 is rotationally driven by torque generated by a magnetic circuit constituted by the coil 15 and the permanent magnet assembly 17. The permanent magnet assembly 17 is constituted basically by a permanent magnet and a yoke.

Each magnetic head 9 includes a servo head for reading out positioning information from a servo information recording surface of the magnetic disk medium 1 and a data head for reading/writing data with respect to a data recording surface of the magnetic disk medium 1. A data head of the uppermost magnetic head 9 is shown in FIG. 1.

It should be noted that the arm assembly 12 includes a servo arm (not shown) and a data arm (not shown) corresponding to the servo head and the data head, respectively.

A pair of stoppers 40 are provided outside the C shaped arm 50 with a predetermined distance therebetween. The stoppers 40 prevent the magnetic head 9 from being separated from the magnetic disk medium 1, even if the arm assembly 12 runs recklessly.

The magnetic head positioner of the conventional magnetic disk apparatus mentioned above, however, has problems to be described below.

In a normal operation, it is possible to accurately position the data head with respect to the magnetic disk medium based on the positioning information read out by the servo head, even if the seek operation for moving the arm assembly on which the magnetic head is mounted is performed at high speed. However, there may be an erroneous operation or reckless run of the arm assembly itself for some reason. In such case, when the C shaped arm collides with either stopper at a speed as high as about 1 to 3 m/s, the C shaped arm is subjected to a large collision deceleration, whereupon the coil fixed inside of the C shaped arm with adhesive is subjected to a large mechanical shock. The shock itself is absorbed by the adhesive to some extent.

However, when the operating speed of the arm assembly becomes about 2 to 3 m/s in the conventional magnetic head positioner, it becomes impossible to absorb such mechanical shock sufficiently even if the flexibility of the adhesive is very high and thus there is a possibility of damage of the coil adhered to the inside surface of the C shaped arm.

On the other hand, when the C shaped arm collides with either stopper at a speed as high as about 1 to 3 m/s, the C shaped arm is subjected to large collision deceleration which is transmitted to the magnetic head mounted on the front end portion of the arm assembly. As a result, the magnetic head vibrates, so that it becomes impossible to maintain a minute gap between the magnetic head and the magnetic disk medium constant. Therefore, the magnetic head is caused to repeatedly collide with the magnetic disk medium at high speed, leading to damage of the magnetic head itself or head crush.

SUMMARY OF THE INVENTION

A main object of the present invention is to provide a magnetic disk apparatus capable of preventing mechanical shock generated when an arm assembly collides with a stopper due to erroneous operation or reckless run of the arm assembly from being transmitted to a coil or a magnetic head to prevent damage of the magnetic head and head crush caused thereby.

A magnetic head positioner of a magnetic disk apparatus, according to the present invention, has: an arm assembly having a front end portion on which a magnetic head is mounted in a facing relation to a magnetic disk medium for writing/reading information with respect thereto, a rear end portion including a C shaped arm having a pair of holes or recesses having a predetermined depth and a center portion rotatably supported by a rotational shaft through a bearing; a drive coil fixed to an inside surface of the C shaped arm using flexible adhesive; a permanent magnet assembly arranged in a facing relation to the drive coil; and a pair of stoppers provided on opposite sides of the C shaped arm with predetermined distances therefrom for restricting swinging movement of the C shaped arm by contact therewith. The holes or recesses are directly behind the portions of the C-shaped arm struck by the stoppers and are between those portions and the coil on opposite sides of the coil. It may be possible to fill the holes or the recesses of the C shaped arm with elastic members of elastic material having high vibration attenuating characteristics.

BRIEF DESCRIPTION OF THE DRAWINGS

The features and advantages of the present invention will become apparent from the following description when taken in conjunction with the accompanying drawings, in which.

In these figures, same reference numerals depict the same constitutional components, respectively.

DETAILED DESCRIPTION OF THE PREFERRED EMBODIMENTS

Now, embodiments of the present invention will be described with reference to the drawings.

Figure 1:
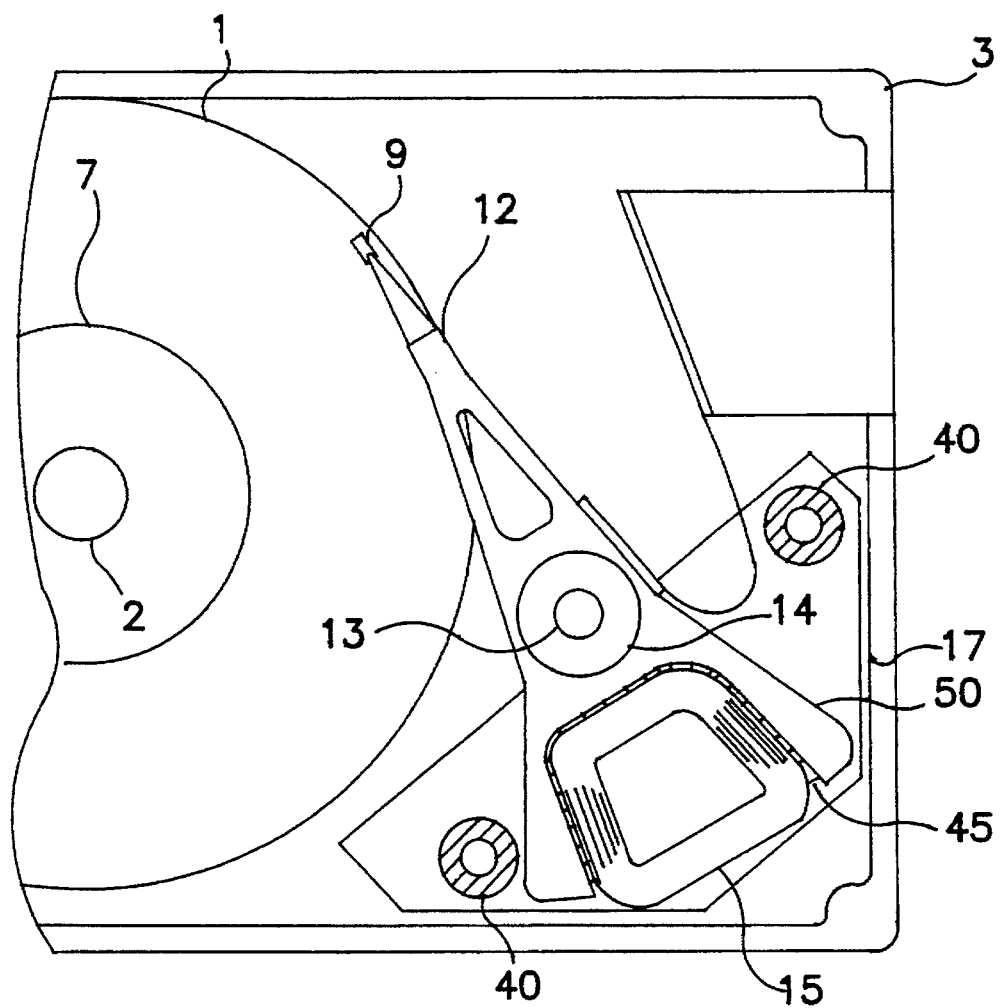
FIG. 1 is a plan view of a magnetic head positioner of a conventional magnetic disk apparatus.
Figure 2:
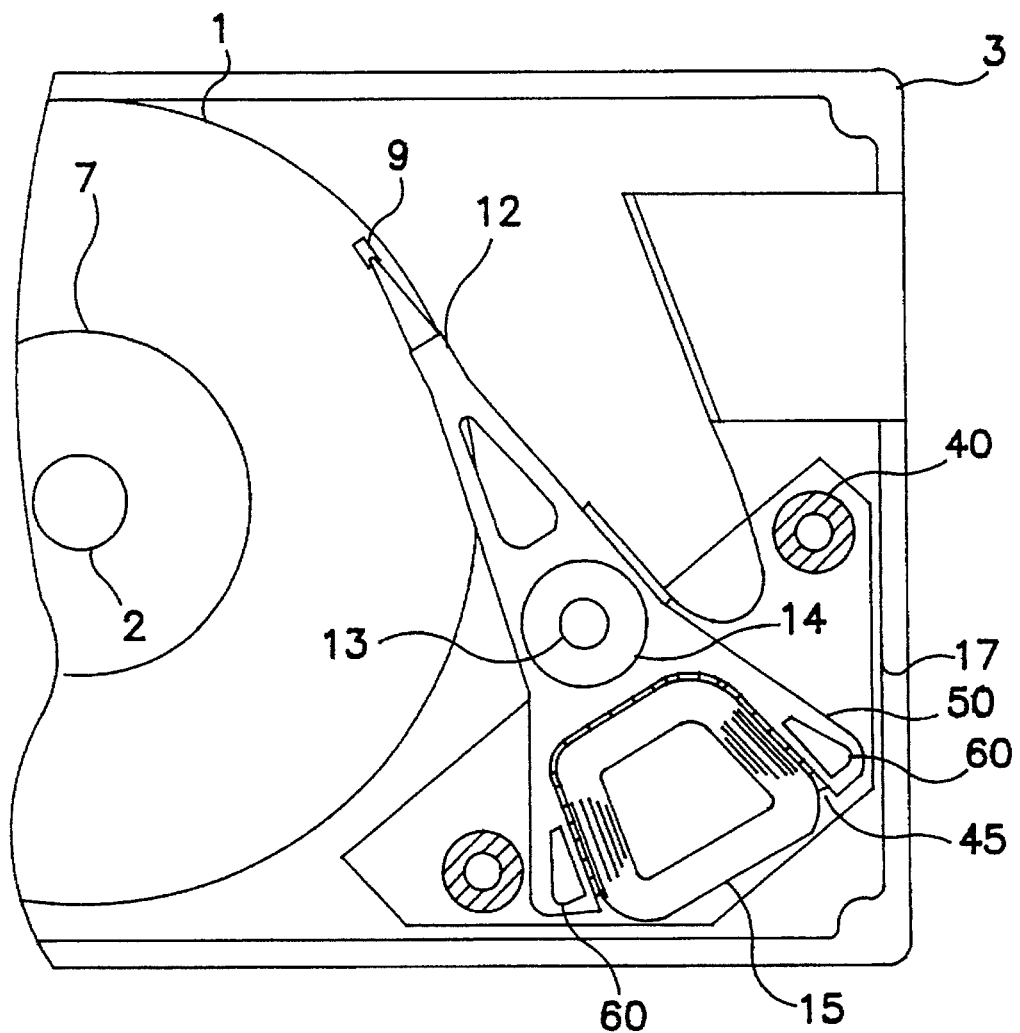
FIG. 2 is a plan view of a first embodiment of the present invention.
Figure 3:
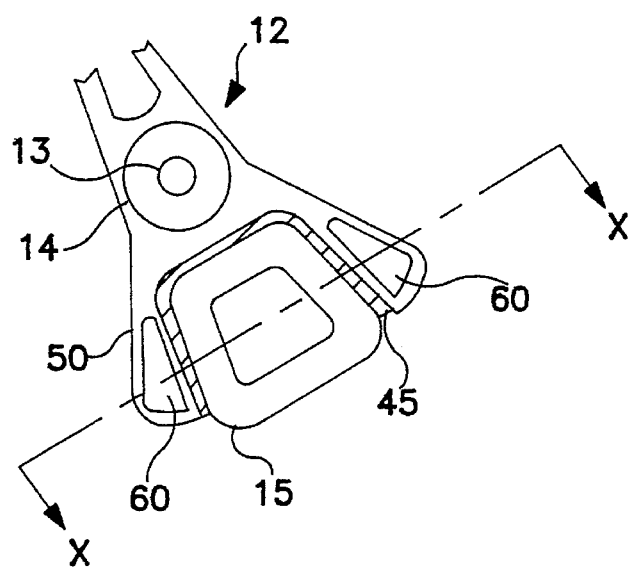
FIG. 3 is a partially enlarged plan view showing a main portion of the first embodiment shown in FIG. 2.
Figure 5:
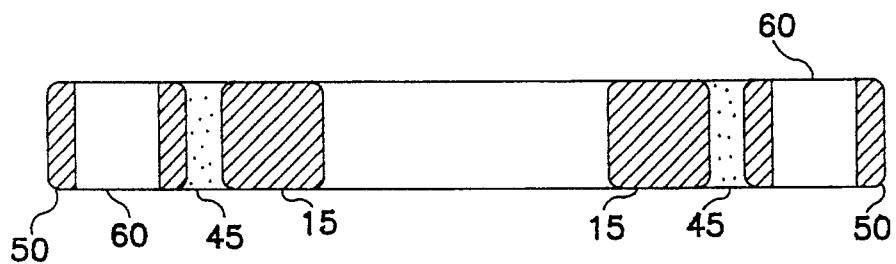
FIG. 5 is a partially enlarged cross section taken along a line X—X in FIG. 3, showing a main portion of the first embodiment of the present invention.

Referring to FIGS. 2, 3 and 5, a first embodiment of the present invention has: a plurality of magnetic disk media 1 mounted on a spindle motor, which is not shown, and supported through clamp rings 7; a spindle shaft 2 having opposite ends fixed to base plates 3 for rotating the plurality of the magnetic disk media 1 mounted on the spindle motor at high speed through bearings; a plurality of magnetic heads 9 provided correspondingly to the respective magnetic disk media 1, each magnetic head 9 including a servo head for reading positioning information from the associated magnetic disk medium 1 and a data head for writing/reading with respect to the magnetic disk medium; a plurality of arm assemblies 12 each including a front end portion having a servo arm and a data arm mounting the servo head and the data head, respectively, a rear end portion having a C shaped arm 50 formed with a pair of holes 60 and fixedly supporting a coil 15 inside the C shaped arm 50 through a flexible adhesive and a center portion rotatably supported by a rotational spindle 13 through a bearing 14; a plurality of permanent magnet assemblies 17 provided in positions facing the coils 15, each permanent magnet assembly 17 being adapted to rotationally drive the arm assembly 12 by torque generated by a magnetic circuit constituted together with the coil 15; and a pair of stoppers provided on opposite sides of the C shaped arm 50 of each arm assembly 12 with predetermined gaps therebetween, the stoppers being adapted to be in contact with the C shaped arm 50 such that the associated magnetic head 9 is kept in a predetermined area of the associated magnetic disk media 1.

Since the arm assemblies 12 have identical constructions and operate in the same manner, a construction and operation of only one arm assembly 12 will be described. Incidentally, the permanent magnet assembly is basically constituted by a permanent magnet and a yoke.

If, for some reason, the arm assembly 12 operates erroneously or runs recklessly, the C shaped arm 50 provided in the rear end portion of the arm assembly 12 collides with one of the stoppers 40 at high speed and a resultant mechanical shock is transmitted to the coil 15 fixed on an inner surface of the C shaped arm through the flexible adhesive 45.

In the first embodiment, however, an amount of elastic deformation of the C shaped arm 50 at the collision is increased due to the existence of the pair of holes 60 in the C shaped arm 50 and so the mechanical shock transmitted to the coil 15 is substantially absorbed. The shock thus reduced is further absorbed by the flexible adhesive 45.

Therefore, it is possible to substantially reduce the mechanical shock transmitted to the coil 15 even if the C shaped arm 50 collides with the stopper 40 at high speed. Consequently, it becomes possible to substantially reduce the possibility of damage of the coil 15 to thereby realize a stable seek operation of the arm assembly 12.

Due to the increased amount of elastic deformation of the C shaped arm 50 at the time of collision which is realized by the provision of the holes 60 in the C shaped arm 50, a mechanical shock transmitted to the magnetic head 9 mounted on the front end portion of the arm assembly 12 is also reduced substantially. Therefore, the magnetic head 9 does not repeatedly collide with the magnetic disk medium 1 at high speed, resulting in that the possibility of damage of the magnetic head 9 or head crush can be substantially reduced.

Figure 6:
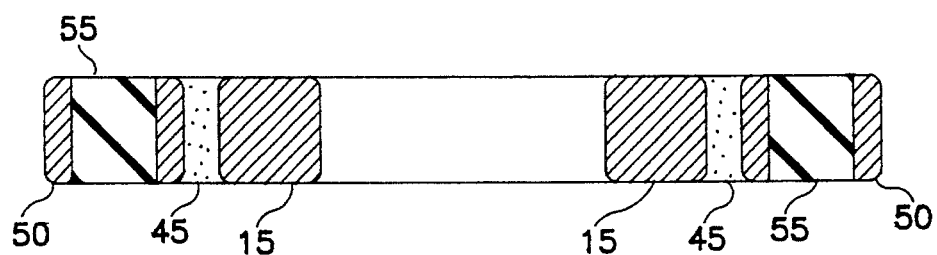
FIG. 6 is a partially enlarged cross section taken along a line X—X in FIG. 4, showing a main portion of the second embodiment of the present invention.

Now, a second embodiment of the present invention will be described with reference to FIGS. 4 and 6. FIG. 6 is a partially enlarged cross section of the arm assembly 12 taken along a line corresponding to the line X—X in FIG. 3.

Figure 4:
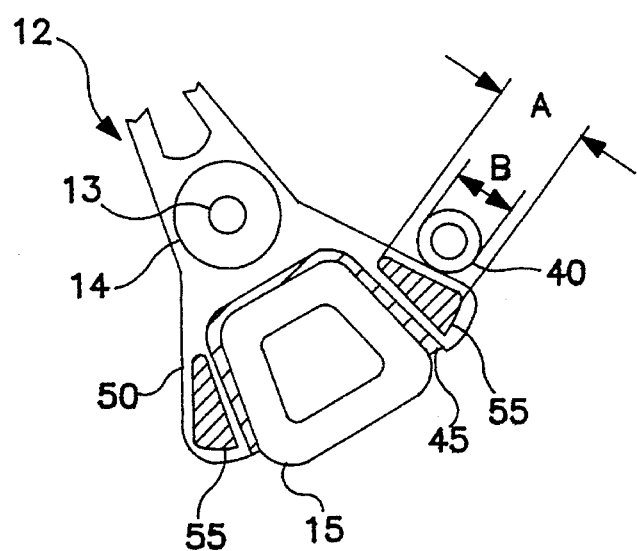
FIG. 4 is a partially enlarged plan view showing a main portion of a second embodiment of the present invention.

Referring to FIGS. 4 and 6, in the second embodiment, the holes 60 formed in the C shaped arm 50 are filled with elastic members 55 of a material exhibiting superior vibration attenuating characteristics.

If, for some reason, the arm assembly 12 operates erroneously or runs recklessly, the C shaped arm 50 provided in the rear end portion of the arm assembly 12 collides with one of the stoppers 40 at high speed and a resultant mechanical shock is transmitted to the coil 15 fixed on an inner surface of the C shaped arm through the flexible adhesive 45.

In the second embodiment, however, distortion energy due to elastic deformation of the C shaped arm 50 at the collision is converted into thermal energy by the elastic members 55 filling the holes 60 of the C shaped arm 50.

Therefore, the collision energy of the arm assembly 12 when it collides with the stopper 40 at high speed is substantially attenuated and the mechanical shock transmitted to the coil 15 and/or the magnetic head 9 mounted on the front end portion of the arm assembly 12 is substantially reduced.

Therefore, in the second embodiment, it is possible to reduce the collision energy more compared with the first embodiment due to the elastic members 55 filling the holes 60 to thereby reduce the mechanical shock transmitted to the coil 15 or the magnetic head 9. Consequently, it becomes possible to substantially reduce the possibility of damage of the coil 15 or the magnetic head 9.

Figure 8:
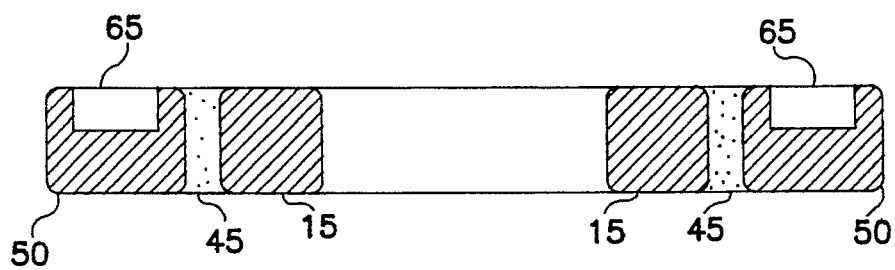
FIG. 8 is a partially enlarged cross section taken along a line Y—Y in FIG. 7, showing a main portion of the third embodiment of the present invention.
Figure 7:
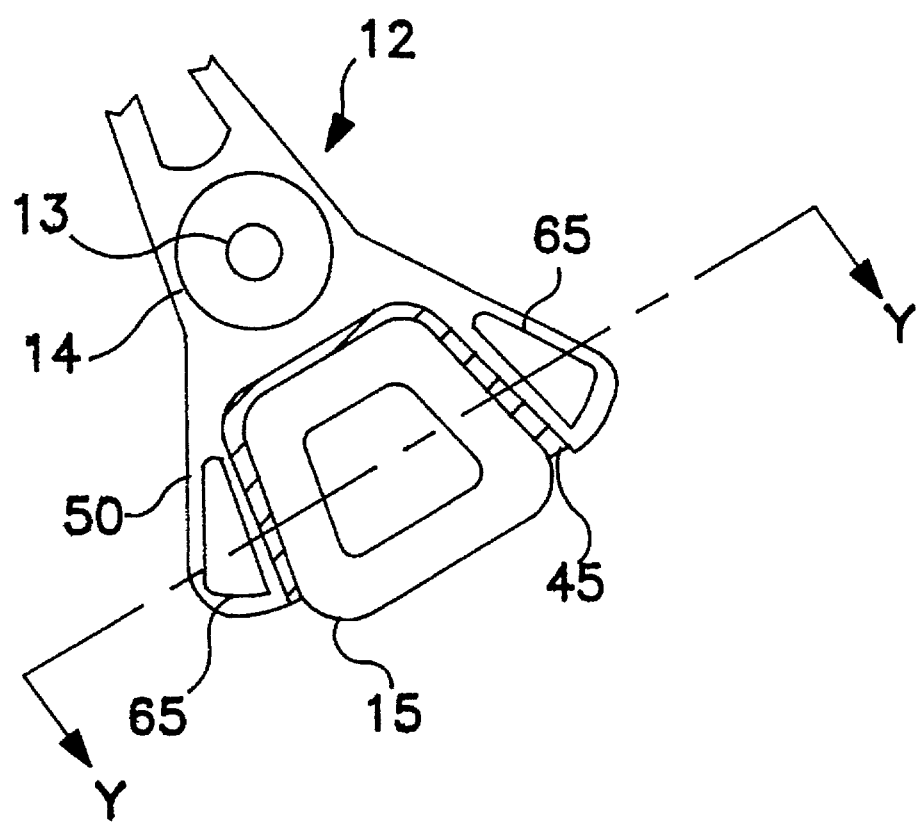
FIG. 7 is a partially enlarged plan view showing a main portion of a third embodiment of the present invention.

FIGS. 7 and 8 shows a third embodiment of the present invention.

Referring to FIGS. 7 and 8, the third embodiment differs from the first and second embodiments in that the C shaped arm 50 is formed with not holes but recesses 65 having a predetermined depth at substantially the same positions of the C shaped arm 50 as those of the holes 60.

If, for some reason, the arm assembly 12 operates erroneously or runs recklessly, the C shaped arm 50 provided in the rear end portion of the arm assembly 12 collides with one of the stoppers 40 at high speed and a resultant mechanical shock is transmitted to the coil 15 fixed on an inner surface of the C shaped arm through the flexible adhesive 45.

In the third embodiment, however, an amount of elastic deformation of the C shaped arm 50 at the collision is increased due to the existence of the pair of recesses 65 in the C shaped arm 50 and so the mechanical shock transmitted to the coil 15 is substantially absorbed. The shock thus reduced is further absorbed by the flexible adhesive 45.

Therefore, it is possible to substantially reduce the mechanical shock transmitted to the coil 15 even if the C shaped arm 50 collides with the stopper 40 at high speed. Consequently, it becomes possible to substantially reduce the possibility of damage of the coil 15 to thereby realize a stable seek operation of the arm assembly 12.

Due to the increased amount of elastic deformation of the C shaped arm 50 at the time of collision which is realized by the provision of the recesses 65 in the C shaped arm 50, a mechanical shock transmitted to the magnetic head 9 mounted on the front end portion of the arm assembly 12 is also reduced substantially. Therefore, the magnetic head 9 does not repeatedly collide with the magnetic disk medium 1 at high speed, resulting in that the possibility of damage of the magnetic head 9 or head crush can be substantially reduced.

A fourth embodiment of the present invention will be described with reference to FIG. 9 which is a partially enlarged cross section of the fourth embodiment taken along a line corresponding to the line Y—Y in FIG. 7.

Figure 9:
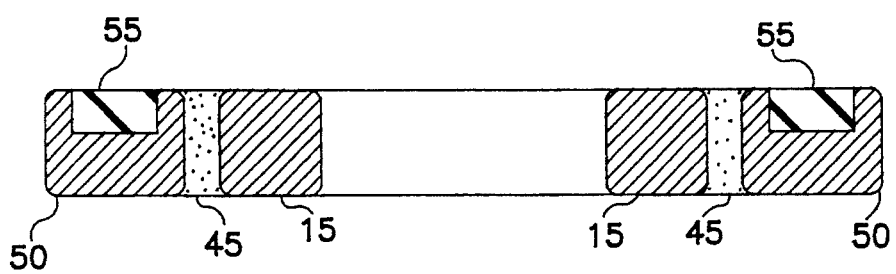
FIG. 9 is a partially enlarged plan view showing a main portion of a fourth embodiment of the present invention.

Referring to FIG. 9, the fourth embodiment differs from the third embodiment in that the recesses 65 are filled with elastic members 55 of a material having superior vibration attenuating characteristics.

If, for some reason, the arm assembly 12 operates erroneously or runs recklessly, the C shaped arm 50 provided in the rear end portion of the arm assembly 12 collides with one of the stoppers 40 at high speed and a resultant mechanical shock is transmitted to the coil 15 fixed on an inner surface of the C shaped arm through the flexible adhesive 45.

In the fourth embodiment, however, distortion energy due to elastic deformation of the C shaped arm 50 at the collision is converted into thermal energy by the elastic members 55 filling the recesses 65 of the C shaped arm 50.

Therefore, the collision energy of the arm assembly 12 when it collides with the stopper 40 at high speed is substantially attenuated and the mechanical shock transmitted to the coil 15 or the magnetic head 9 mounted on the front end portion of the arm assembly 12 is substantially reduced.

Therefore, in the fourth embodiment, it is possible to reduce the collision energy more compared with the first embodiment due to the elastic members 55 filling the recesses 65 to thereby reduce the mechanical shock transmitted to the coil 15 or the magnetic head 9. Consequently, it becomes possible to substantially reduce the possibility of damage of the coil 15 or the magnetic head 9.

The elastic material forming the elastic member 55 used in the second and fourth embodiments may be adhesive, rubber or plastics having superior vibration attenuating characteristics. For example, adhesive including epoxy resin may be used. In general, such adhesive exhibits superior properties such as abrasion resistivity and chemical substance resistivity. As the rubber material, rubber including urethane, such as urethane rubber or polyurethane rubber, rubber including fluorine, such as fluorinated rubber, fluororubber or fluoroelastomer, may be used. The urethane rubber or polyurethane rubber has generally high hardness and high elasticity and, particularly, it exhibits high abrasion resistivity and high tensile strength. On the other hand, fluorinated rubber, fluororubber or fluoroelastomer has resistivity against heat, chemical substance, oil, solvent, weather and ozone, generally. Further, as the plastic material, polyformaldehyde which is a polyacetal may be used. Generally, polyformaldehyde exhibits superior mechanical properties and resistivities against abrasion, chemical substance and heat and, particularly, its friction coefficient is small.

In the present invention, length A of the hole 60 or the recess 65 formed in the C shaped arm 50 in a direction substantially parallel to a collision face thereof, which is to say along the arm assembly 12, is larger than a diameter B of the associated stopper 40, in order to enhance the effect of vibration attenuating characteristics of the elastic member 55 filling the holes 60 or the recesses 65 of the C shaped arm 50.

As described hereinbefore, according to the magnetic head positioner for the magnetic disk apparatus of the present invention, it is possible to substantially reduce the mechanical shock transmitted to the coil or the magnetic head even if the C shaped arm collides with the stopper at high speed due to erroneous operation or reckless run of the arm assembly. Consequently, it becomes possible to substantially reduce the possibility of damage of the coil or the magnetic head and head crush.

While the present invention has been described in conjunction with the preferred embodiments thereof, it will now be readily possible for those skilled in the art to put this invention into practice in various other manners.

What is claimed is:

1. A magnetic head positioner for a magnetic disk apparatus, comprising:

an arm assembly having a front end portion on which a plurality of magnetic heads opposed to a plurality of magnetic disk media, respectively, are mounted, a rear end portion having a C shaped arm formed with a pair of holes in portions of the C shaped arm distal from said front end portion, and a center portion rotatably supported by a rotational shaft through bearings;

a coil, fixedly secured to an inner surface of said C shaped arm through an adhesive, for driving said arm assembly;

a permanent magnet assembly disposed in a location opposite said coil and constituting a magnetic circuit together with said coil; and a pair of stoppers provided on opposite sides of said C shaped arm with predetermined spacing and adapted to restrict a rotational movement of said C shaped arm by contacting said C shaped arm; wherein each hole of said pair of holes is adjacent a surface of said C shaped arm contacted by one of said stoppers and serves to absorb mechanical shocks generated by contact between said C shaped arm and said stoppers 2. The magnetic head positioner as claimed in claim 1, wherein a length of each of said holes of said C shaped arm in a direction along said arm is larger than a diameter of said stopper.

3. The magnetic head positioner as claimed in claim 1, wherein said holes of said C shaped arm are filled with elastic material having superior vibration attenuating characteristics.

4. The magnetic head positioner as claimed in claim 3, wherein said elastic material is an adhesive including epoxy resin.

5. The magnetic head positioner as claimed in claim 3, wherein said elastic material is rubber including fluorine.

6. The magnetic head positioner as claimed in claim 3, wherein said elastic material is rubber including urethane.

7. The magnetic head positioner as claimed in claim 3, wherein said elastic material is polyacetal.

8. The magnetic head positioner as claimed in claim 3, wherein said elastic material is polyformaldehyde.

9. The magnetic head positioner as claimed in claim 1, wherein said holes are directly behind the portions of the C-shaped arm struck by the stoppers.

10. The magnetic head positioner as claimed in claim 1, wherein said holes are between those portions of the C-shaped arm struck by the stoppers and the coil and are disposed on opposite sides of the coil.

11. A magnetic head positioner for a magnetic disk apparatus, comprising:

an arm assembly having a front end portion on which a plurality of magnetic heads opposed to a plurality of magnetic disk media, respectively, are mounted, a rear end portion having a C shaped arm formed with a pair of recesses having a predetermined depth and located in portions of the C shaped arm distal from said front end portion, and a center portion rotatably supported by a rotational shaft through bearings;

a coil fixedly secured to an inner surface of said C shaped arm through an adhesive for driving said arm assembly;

a permanent magnet assembly disposed in a location opposite said coil and constituting a magnetic circuit together with said coil; and a pair of stoppers providing on opposite sides of said C shaped arm with predetermined spacing and adapted to restrict a rotational movement of said C shaped arm by contacting said C shaped arm; wherein each recess of said pair of recesses is adjacent a surface of said C shaped arm contacted by one of said stoppers and serves to absorb mechanical shocks generated by contact between said C shaped arm and said stoppers.

12. The magnetic head positioner as claimed in claim 11, wherein a length of each of said recesses of said C shaped arm along said arm is larger than a diameter of said stopper.

13. The magnetic head positioner as claimed in claim 11, wherein said recesses of said C shaped arm are filled with elastic material having superior vibration attenuating characteristics.

14. The magnetic head positioner as claimed in claim 13, wherein said elastic material is an adhesive including epoxy resin.

15. The magnetic head positioner as claimed in claim 13, wherein said elastic material is rubber including fluorine.

16. The magnetic head positioner as claimed in claim 13, wherein said elastic material is rubber including urethane.

17. The magnetic head positioner as claimed in claim 13, wherein said elastic material is polyacetal.

18. The magnetic head positioner as claimed in claim 13, wherein said elastic material is polyformaldehyde.

19. The magnetic head positioner as claimed in claim 11, wherein said recesses are directly behind the portions of the C-shaped arm struck by the stoppers.

20. The magnetic head positioner as claimed in claim 11, wherein said recesses are between those portions of the C-shaped arm struck by the stoppers and the coil and are disposed on opposite sides of the coil.

* * * * *